(12) United States Patent
Chung et al.

(10) Patent No.: US 6,825,832 B2
(45) Date of Patent: Nov. 30, 2004

(54) HAND HELD INTERNET BROWSER WITH FOLDING KEYBOARD

(75) Inventors: Caleb Chung, Boise, ID (US); Chris L. Hubbell, Valley Glen, CA (US); Victor J. Valenti, Redondo Beach, CA (US); Stuart K. Imai, Redondo Beach, CA (US)

(73) Assignee: Vercel Development, Inc., Encino, CA (US)

( * ) Notice: Subject to any disclaimer, the term of this patent is extended or adjusted under 35 U.S.C. 154(b) by 0 days.

(21) Appl. No.: 09/727,434

(22) Filed: Nov. 30, 2000

(65) Prior Publication Data

US 2002/0063690 A1 May 30, 2002

Related U.S. Application Data

(60) Provisional application No. 60/167,992, filed on Nov. 30, 1999.

(51) Int. Cl.[7] .................................................. G09G 5/00
(52) U.S. Cl. ...................... 345/168; 345/169; 345/901; 345/903; 345/905
(58) Field of Search ................................ 345/168, 169, 345/901; 341/20, 21, 22; 235/380, 486; 455/343; 364/708

(56) References Cited

U.S. PATENT DOCUMENTS

| | | | | |
|---|---|---|---|---|
| 4,096,577 A | * | 6/1978 | Ferber et al. ................ | 174/254 |
| 5,189,632 A | * | 2/1993 | Paajanen et al. ............ | 708/109 |
| 5,227,614 A | * | 7/1993 | Danielson et al. ........... | 235/380 |
| 5,481,263 A | * | 1/1996 | Choi ............................. | 341/20 |
| 5,559,531 A | * | 9/1996 | Schiffer ....................... | 345/168 |
| 5,767,464 A | * | 6/1998 | Dyer et al. .................. | 200/344 |
| 5,812,116 A | * | 9/1998 | Malhi .......................... | 200/517 |
| 5,890,016 A | * | 3/1999 | Tso ............................... | 710/2 |
| 5,915,661 A | * | 6/1999 | Silverman et al. ......... | 248/465.1 |
| 5,941,648 A | * | 8/1999 | Robinson et al. ............ | 400/100 |
| 5,943,041 A | * | 8/1999 | Allison et al. ............... | 345/168 |
| 5,995,025 A | * | 11/1999 | Sternglass et al. ............. | 341/22 |
| 6,038,313 A | * | 3/2000 | Collins ................... | 379/433.07 |
| 6,046,730 A | * | 4/2000 | Bowen et al. ............... | 345/168 |
| 6,081,207 A | * | 6/2000 | Batio .......................... | 341/20 |
| 6,170,743 B1 | * | 1/2001 | Okaue et al. ................ | 235/379 |
| 6,266,234 B1 | * | 7/2001 | Leman ...................... | 312/208.4 |
| 6,313,762 B1 | * | 11/2001 | Crowley et al. ............... | 341/20 |
| 6,383,079 B1 | * | 5/2002 | Takeda et al. ................. | 463/31 |
| 6,628,963 B1 | | 9/2003 | Chung | |
| 2002/0068619 A1 | * | 6/2002 | Nagai ......................... | 455/575 |

FOREIGN PATENT DOCUMENTS

| | | |
|---|---|---|
| EP | 0 837 406 | 4/1998 |
| GB | 2 279 617 | 1/1995 |
| WO | WO 99/35557 | 7/1999 |
| WO | WO 00/10878 | * 2/2002 |

OTHER PUBLICATIONS

Ohshita, et al., Compact Personal Computer Memory Card Interface Association Keypad for Tablet Personal Computer, IBM Technical Disclosure Bulletin, Feb. 1997, pp. 59–60, vol 40, No. 2, IBM Corp., New York.

* cited by examiner

Primary Examiner—Vijay Shankar
Assistant Examiner—Leonid Shapiro
(74) Attorney, Agent, or Firm—Schiff Hardin LLP

(57) ABSTRACT

A hand held computer is provided wherein data input is facilitated through a full function, folding keyboard, that is suitable for touch typing. In addition, the present invention utilizes an open architecture, embedded technology system design in conjunction with web based content to provide a full function affordable portal to the Internet. The hand held computer may be modified to play music files when in a closed position and may be modified to play game files when in a second position.

31 Claims, 14 Drawing Sheets

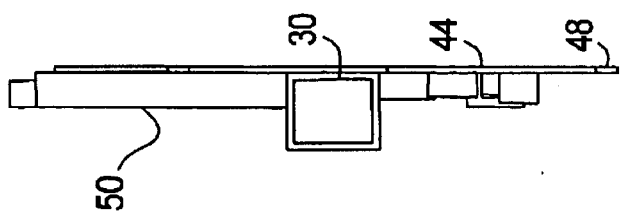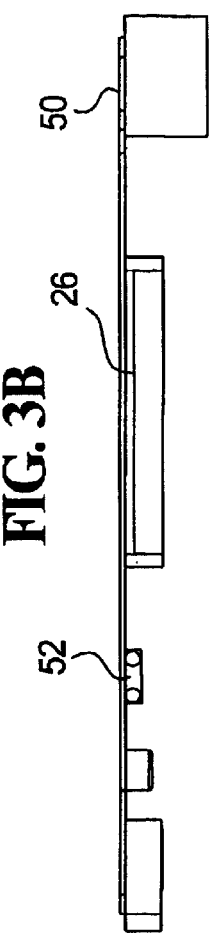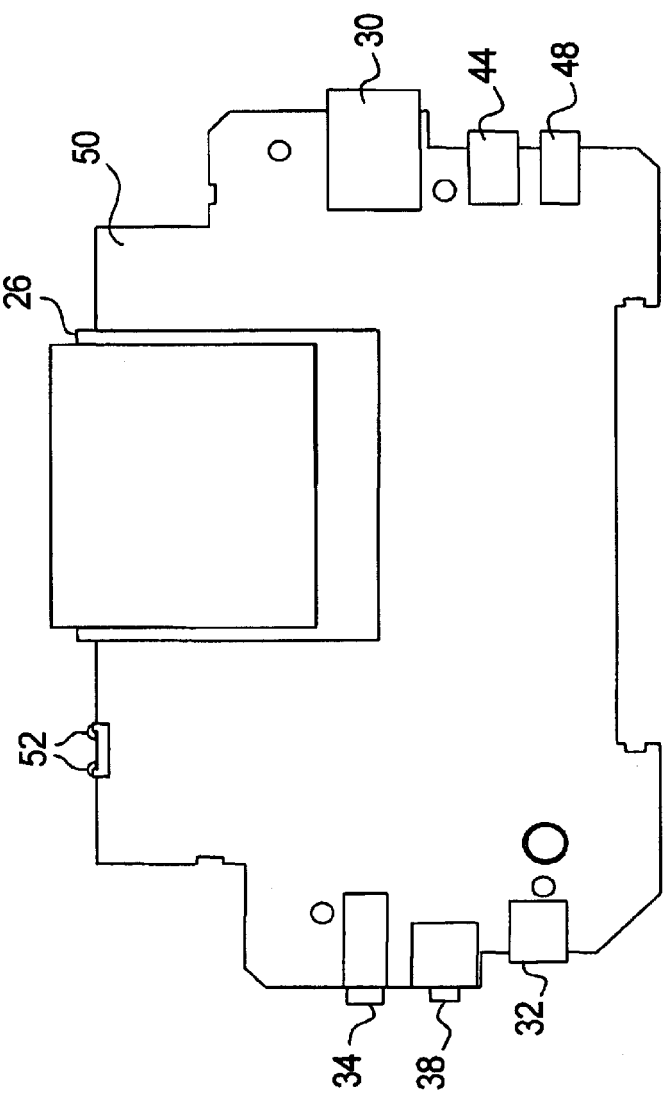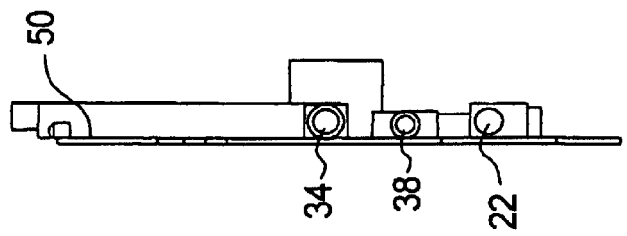

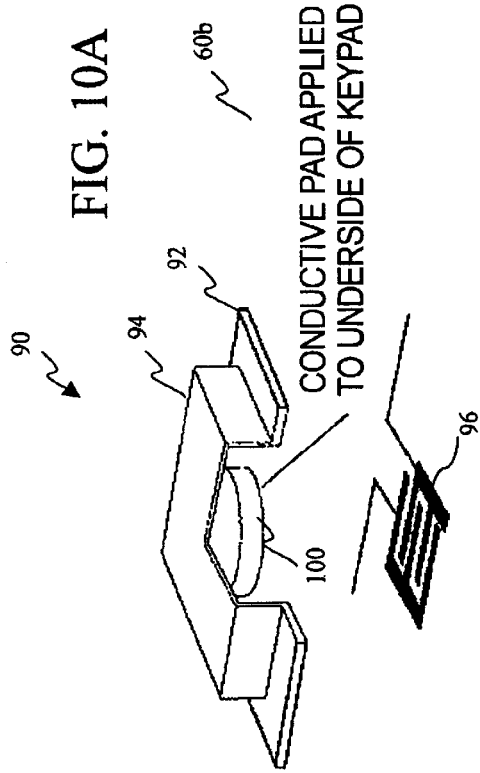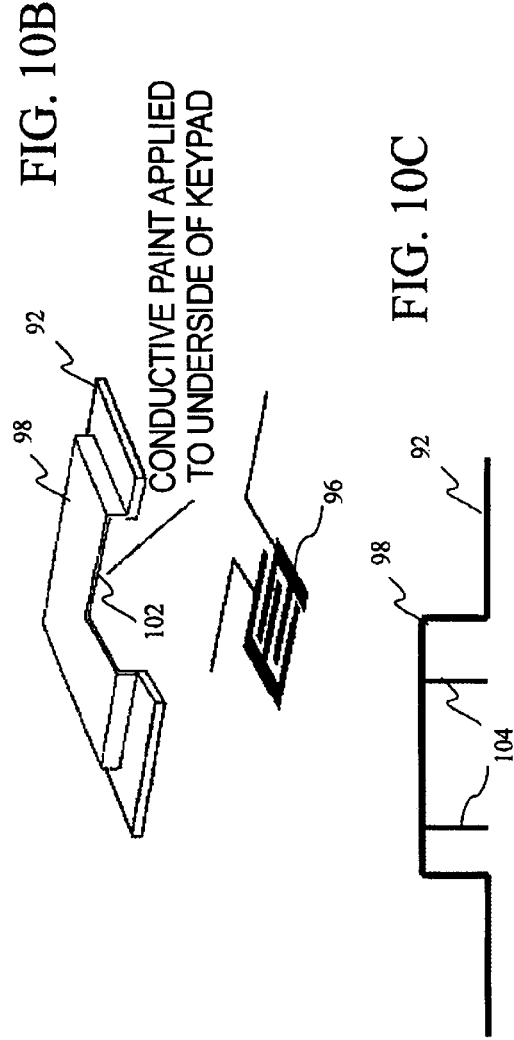

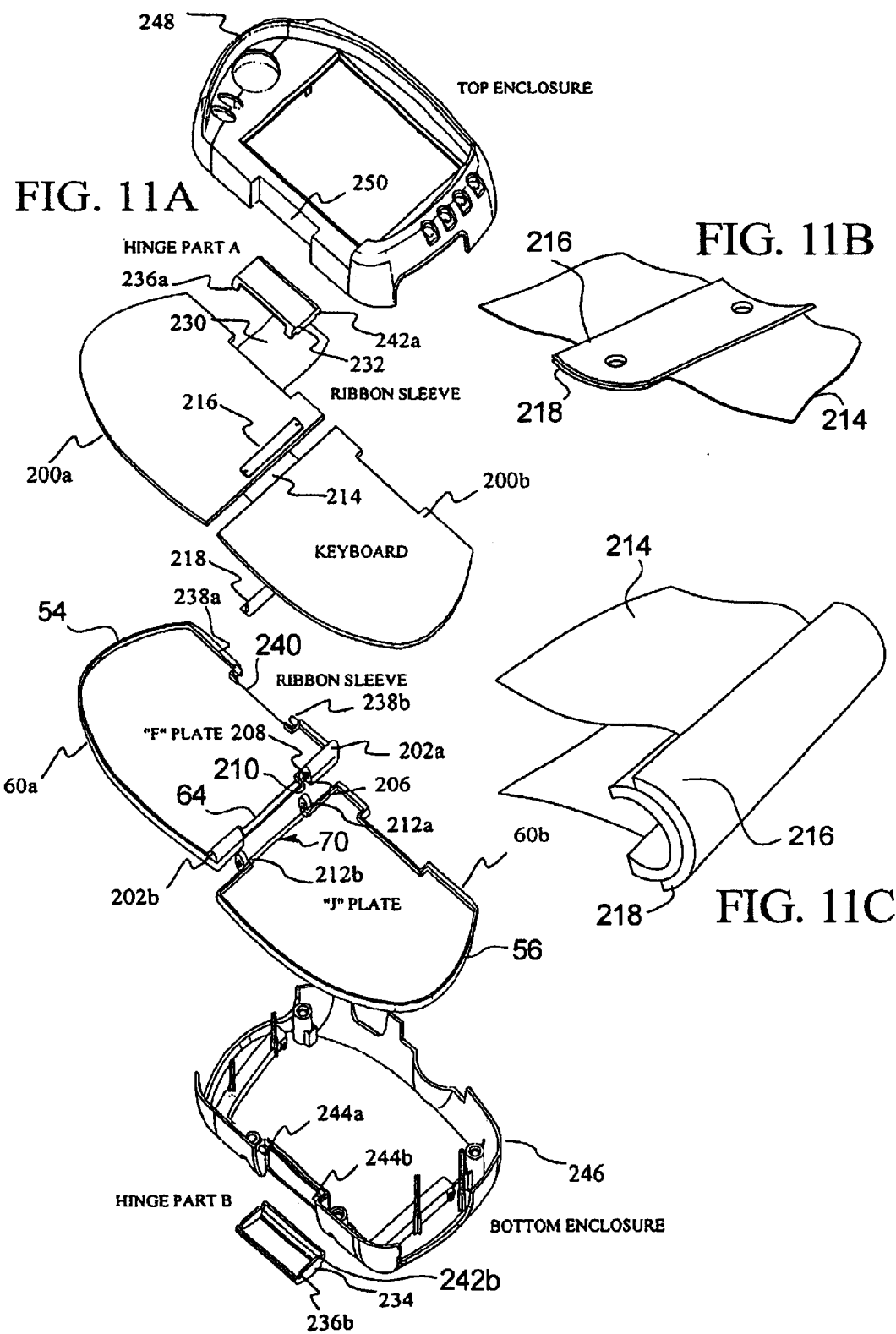

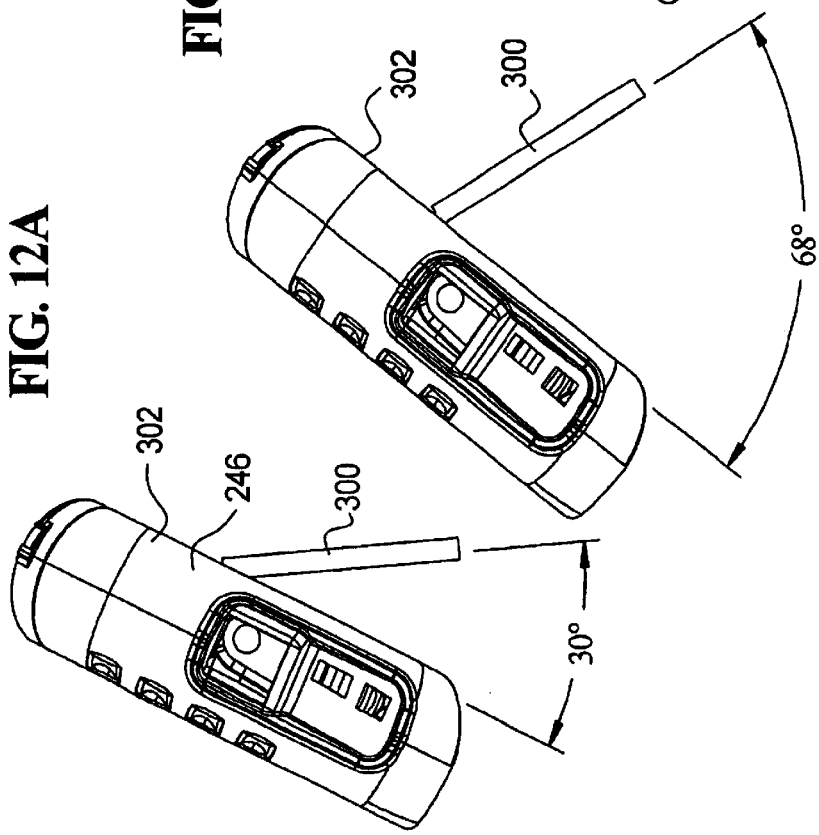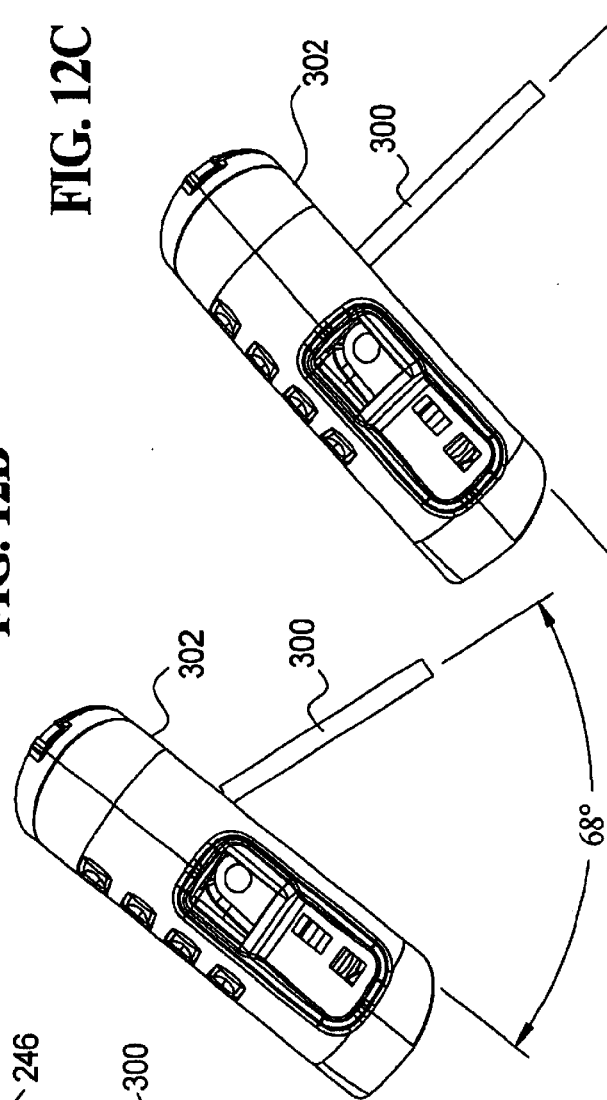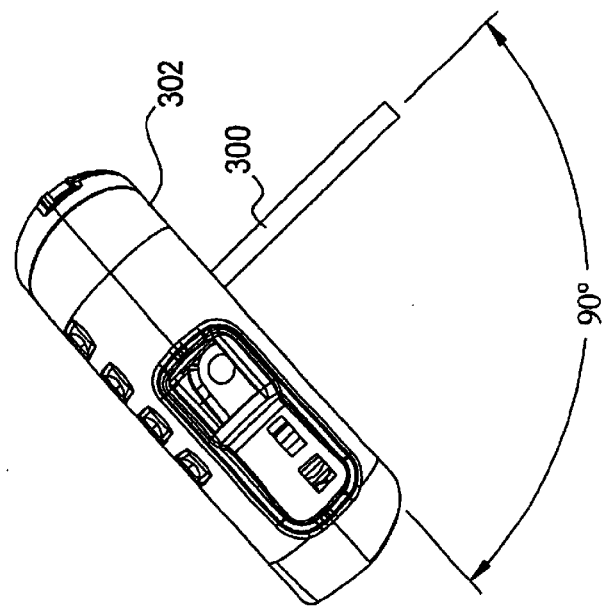

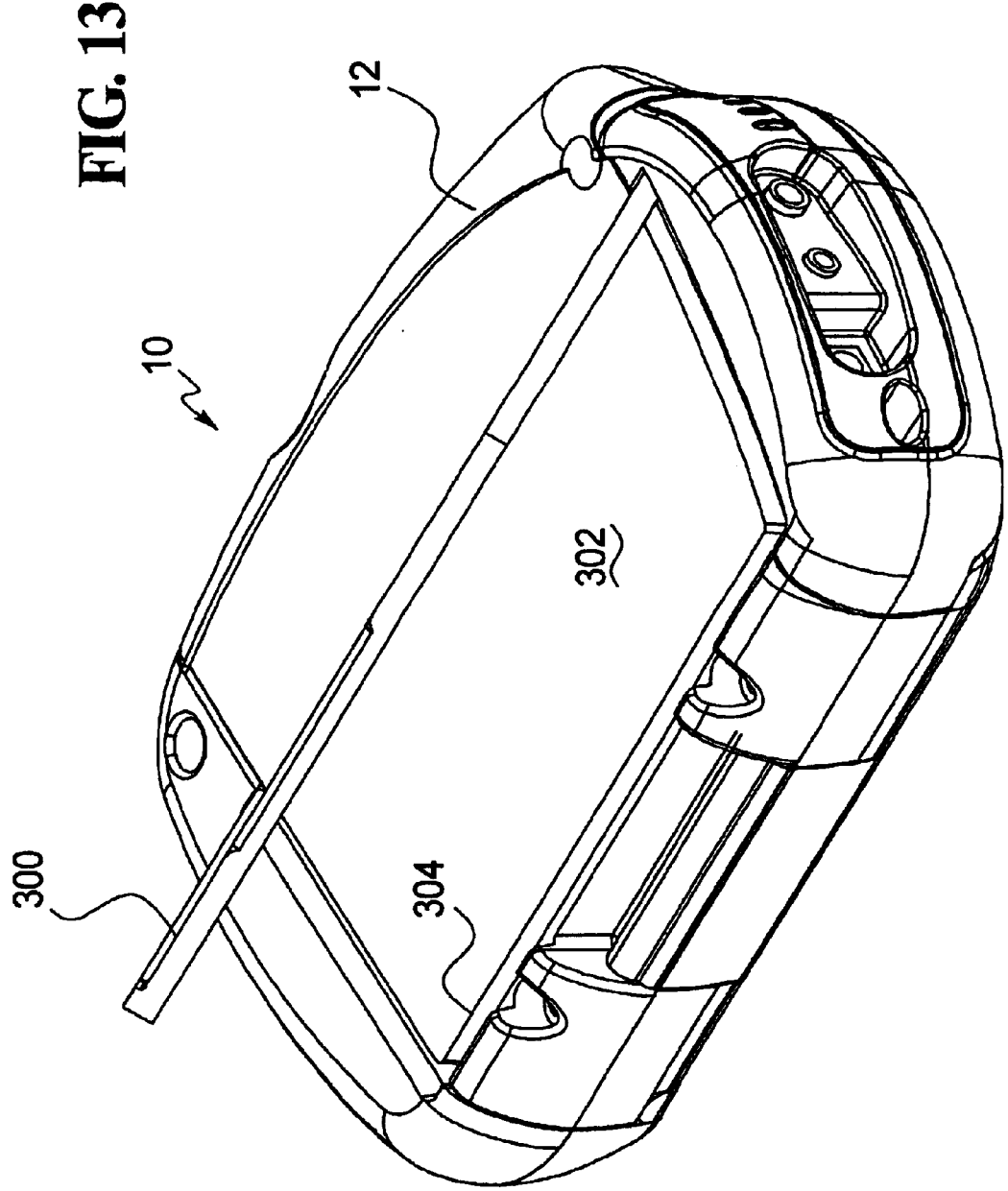

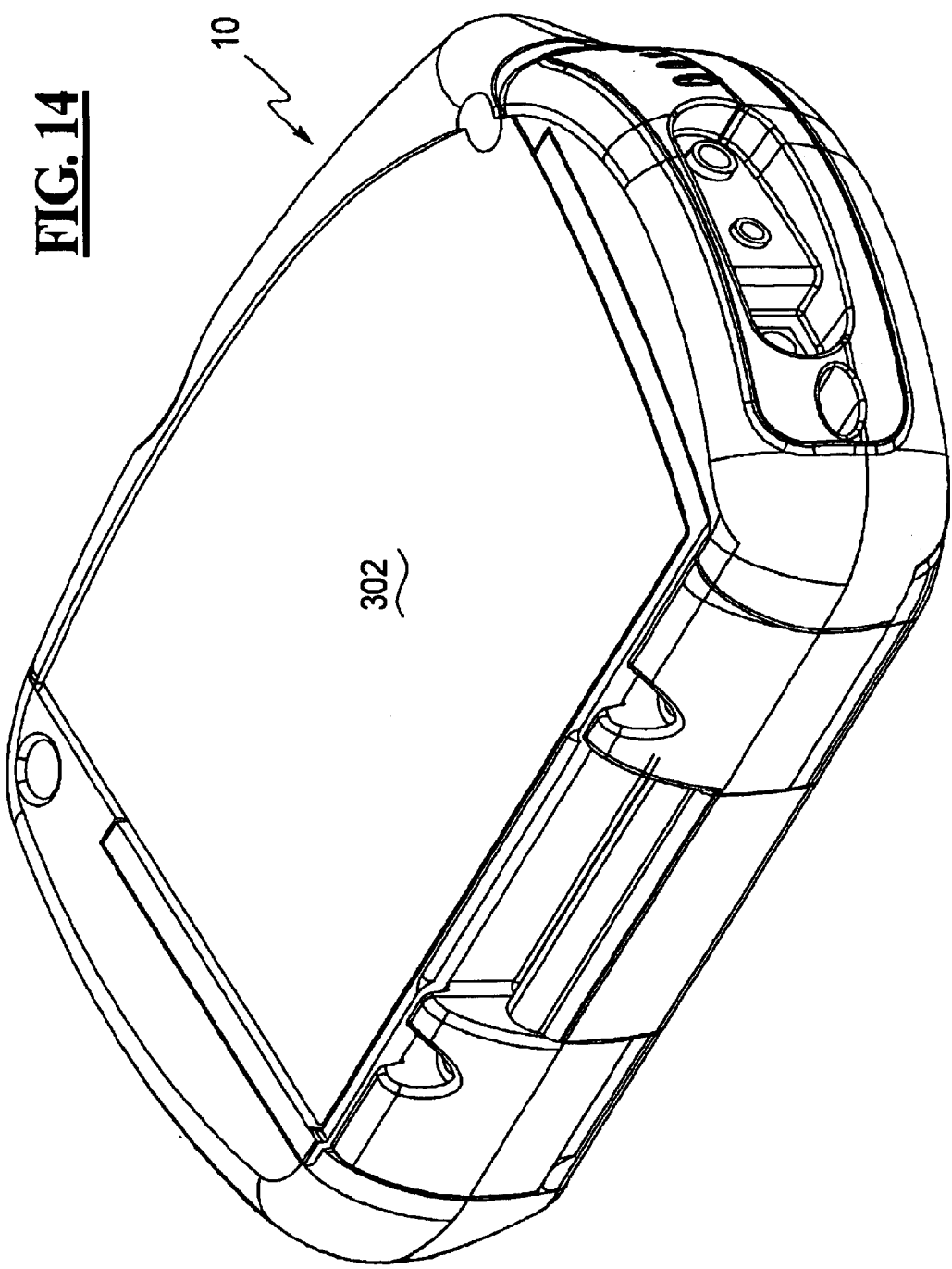

HAND HELD INTERNET BROWSER WITH FOLDING KEYBOARD

CROSS-REFERENCE TO RELATED APPLICATION

This application claims priority to U.S. Provisional Patent Application No. 60/167,992, filed Nov. 30, 1999, the content of which is hereby incorporated by reference.

BACKGROUND OF THE INVENTION

This invention relates generally to portable computers, and more particularly to handheld computers capable of downloading and uploading information from the Internet.

Access to the Internet for the purpose of retrieving or sending information is typically done using a desktop computer. Accessing Internet information using a desktop computer is cost prohibitive for many users. In addition, desktop computer access to the Internet is inefficient because it makes the desired information available to the user only at a relatively permanent, central location. The use of traditional mobile computer systems, such as, for example, laptop and notebook computers, improves the portability of the Internet access device while maintaining a significant portion of the speed and features provided by desktop computer systems. However, Internet access via a traditional mobile computer for many users is again cost prohibitive.

Similarly, the use of traditional Personal Digital Assistants (PDAs) or wireless communication devices to access the Internet also suffer from numerous disadvantages. For example, commercially available PDAs are relatively costly, with starting prices ranging from several hundred dollars to one thousand dollars and more. Such prices rival current pricing for desktop systems, are cost prohibitive for the public at large, and serve to maintain the economic barrier to Internet access.

Wireless hand held computer devices, such as cellular and Personal Communication System (PCS) telephones are more reasonably priced, but have limited display and processing capabilities. Prior art wireless computer units typically utilize touch sensitive display screens as the input/output device. These screen are relatively small (1.5–2.5" diagonal), and typically have limited function key capability. In addition wireless computer units typically employ Wireless Application Protocol (WAP) that limits Internet browsing. These devices therefore lack the capabilities required to interactively browse the varied text, graphic and video applications available on the Internet.

In addition, in many of the portable and stationary applications, it is necessary for the overall size of the keyboards to be reduced when the keyboards and products are stored and transported, especially for portable applications. However, during use it is desirable for the keyboards to conform to standard sizes to have a typical "feel" for ease and comfort of use. The overall size of the keyboard is particularly critical for text entry via "touch typing."

Therefore, it would be advantageous to provide a method and an apparatus for portable computing that is widely affordable and includes sufficient input/output capability.

SUMMARY OF THE INVENTION

There is therefore provided, according to a presently preferred embodiment of the present invention, a hand held computer having a full function, ergonomically designed, folding keyboard that is suitable for touch typing that is also affordable while maintaining a minimal design footprint.

The present invention provides a device that permits the inclusion of an ergonomic keyboard fully integrated with a handheld computer. The present invention provides an improved hand held computer arrangement wherein data input is facilitated through a full function, folding keyboard that is suitable for touch typing. In addition, the present invention utilizes an open architecture, embedded technology system design in conjunction with web based content to provide a full function affordable portal to the Internet.

In another aspect of the present invention, a hand held personal computer includes a housing having a display mounted in a lower surface of the housing, a folding keyboard having first and second keyboard sections, that are pivotally coupled to the housing for pivotal movement about a housing axis, wherein the folding keyboard couples to the lower housing surface, substantially covering the display when in a closed position, and a hinge mechanism pivotally coupling the first and second keyboard sections for pivotal movement one relative to the other about a keyboard axis.

In a further aspect of the present invention, a hand held web browser includes an embedded computer comprising a microprocessor and a data storage device coupled to the microprocessor for storing a real-time operating system and a thin Internet browser for execution by the microprocessor, a housing having a display mounted in a lower surface of the housing, wherein the microprocessor is coupled to the display, a folding keyboard, which has first and second keyboard sections, pivotally coupled to the housing for pivotal movement about a housing axis, wherein the folding keyboard couples to the lower housing surface, substantially overlaying the display when in a closed position, and a hinge mechanism pivotally coupling the first and second keyboard sections for pivotal movement one relative to the other about a keyboard axis.

BRIEF DESCRIPTION OF THE DRAWINGS

These and other features, aspects, and advantages of the present invention will become better understood with regard to the following description, appended claims, and accompanying drawings where:

FIGS. 3A, 3B, 3C and 3D are graphical illustrations of the physical interface between a plurality of I/O ports and the motherboard in accordance with an exemplary embodiment of the present invention in plan view, side view and two end views, respectively;

FIGS. 10A and 10B are exploded views of two low profile finger pads in accordance with exemplary embodiments of the present invention;

FIG. 10C is a cross-section of a low profile finger pad having a rigid support member in accordance with an exemplary embodiment of the present invention;

FIG. 11A is an exploded view of the hand held computer illustrating the assembly of the display housing and folding keyboard in accordance with an exemplary embodiment of the present invention;

FIG. 11B is a perspective view of flex ribbon protective sleeves and the flex ribbon that connects the keyboard halves with keyboard in the open position, in accordance with an exemplary embodiment of the present invention;

FIG. 11C is a perspective view of flex ribbon protective sleeves and the flex ribbon that connects the keyboard halves with the keyboard in the closed position, in accordance with an exemplary embodiment of the present invention;

FIGS. 12A–12C are side views illustrating the operation of a support member for varying the angle of the display housing in accordance with an exemplary embodiment of the present invention;

FIG. 13 is a perspective view of the hand held computer demonstrating the integration of the support member into an upper surface of the display housing in accordance with an exemplary embodiment of the present invention; and FIG. 14 is a perspective view of the hand held computer with the support member in the closed position in accordance with an exemplary embodiment of the present invention.

DETAILED DESCRIPTION OF THE INVENTION

Figure 1:
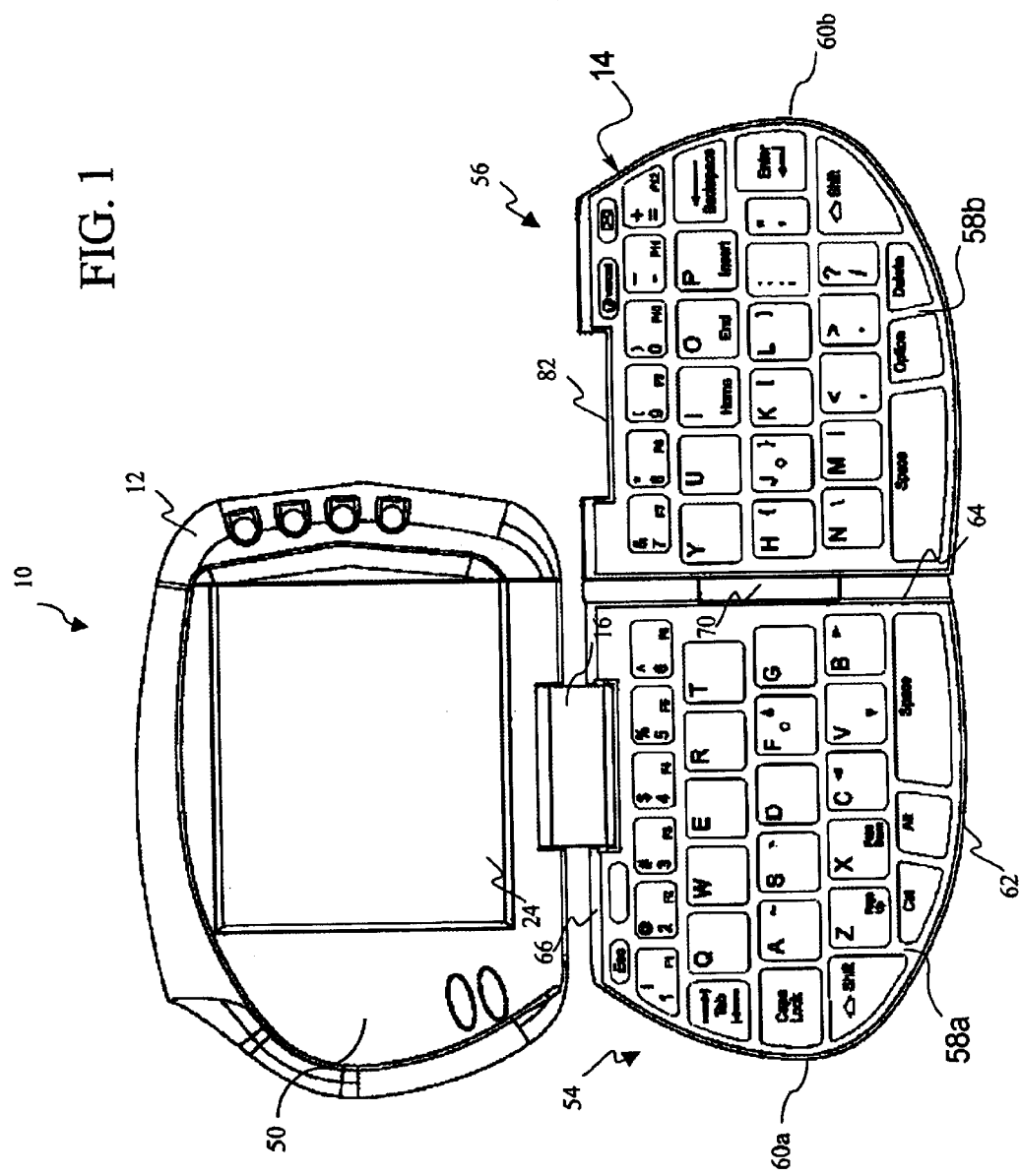
FIG. 1 is a front view of a hand held computer with a full function folding keyboard in accordance with an exemplary embodiment of the present invention.

An exemplary embodiment of the present invention provides a method and apparatus for accessing and downloading information from the Internet to a hand held computer system. In a preferred embodiment, the hand held computer system uses flash memory storage to store an operating system, Internet application software, display application software, and search criteria. The hand held computer downloads information from the Internet to the flash memory for subsequent display of the information via an integrated VGA grayscale or color display. The hand held computer system includes a phone jack through which the Internet is accessed via an internal modem. In addition, the hand held computer includes Internet phone capability (which provides long distance calls at local rates) with Internet messaging as well as wireless Internet browsing.

Commercially available PDA systems typically utilize expensive, memory intensive application software and Operating Systems (OS) in a closed system architecture. Existing systems are prohibitively costly for a large segment of the population because of this reliance upon internal software for scheduling, word processing, browsing the web, etc. Advantageously, the present invention utilizes a less costly OS in an open architecture, embedded computer design approach. The present invention leverages web based systems such as for example, Yahoos calendar, e-mail, address book, etc., to provide full function capability at a fraction of the price of existing portable computing devices. An embedded computer is a microprocessor, and a real-time operating system and application software that has been built into a larger product to handle the control functions of that product.

Unlike multipurpose PC operating systems such as Windows that must take into account every conceivable user input and support a large variety of applications, an embedded system typically need only support a narrow suite of functions. Thus, in an exemplary embodiment of the present invention the operating system may be tailored to perform web based applications.

An advantage of embedded systems is that, partly because they are dedicated to the performance of a single task or specific group of tasks, they can be optimized to deliver a level of speed, reliability, and low cost that PC hardware and software manufacturers can not obtain. As a result, embedded systems have far smaller memory requirements. This enables embedded systems to offer a far more economical approach to building relatively less expensive, Internet-browsing appliances than traditional prior art PC approaches, such as Oracle with its stripped-down network computer.

In an exemplary embodiment, the present invention may utilize Spyglass® Device Mosaic or other similar thin browsers optimized to run on one of the many leading real time operating systems used in the embedded market such as OS9, VxWorks, pSOS, LynxOS, etc. Advantageously, thin browsers typically occupy less than 850 kB of code while fully supporting the latest Internet standard technologies, such as HTML, HTTP, JScript and SSL. In addition such thin browsers can be extended to include features such as Java and XML.

Also, the modular design of typical thin browsers make them scalable across a wide range of devices. Thus, the embedded technology, web based approach of the present invention readily adapts to a variety of applications such as for example, educational applications such as audio enhanced hooked on phonics, study guides, etc., as well as child development applications such as downloaded interactive E-books. Similarly the present invention can interface with a variety of web based publications through E-subscriptions which are downloaded directly from a web site, or research oriented how to guides such as automotive repair magazines, maps etc.

Also, because the embedded technology approach optimizes a given system for a particular application, a hardware locked safe browser can be readily included in a particular embodiment. In addition, a favorite places directory may also be include in a given embodiment, wherein a user can speed dial a given Internet address with a single keystroke.

Figure 5:
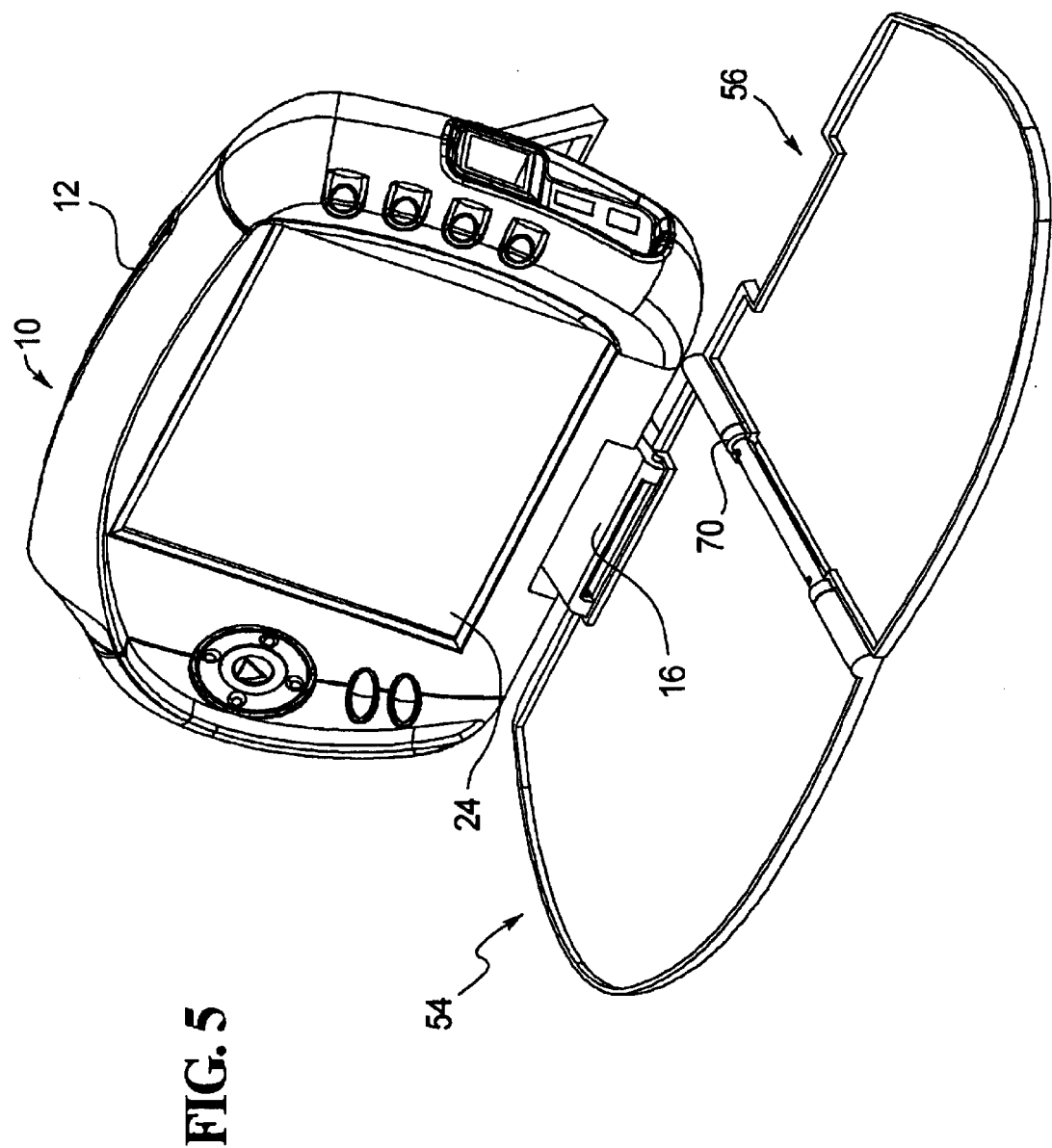
FIG. 5 is a perspective view of the hand held personal computer with the folding keyboard in the open or operation position in accordance with an exemplary embodiment of the present invention.

FIG. 1 shows a front view of a hand held computer 10 according to the present invention. The hand held computer 10 of this invention has a clamshell design having a display housing 12 and keyboard 14 joined for pivotal movement thereof one relative to the other about an elongated housing axis and between a folded position (FIG. 6) and a use position or typing mode (FIG. 5). The hinge structure 16 may be any suitable hinge appropriate to the usage expected of the hand held computer 10, such as a hinge molded of synthetic materials, or other hinges known to persons skilled in the applicable arts of mechanical and aesthetic design.

Computer operating components for performing the desired computer functions are mounted in the display housing 12. At least certain of these components are mounted on a multi-layer motherboard (not shown) that is mounted in the display housing and electrically interconnects components of the hand held computer 10.

Figure 2:
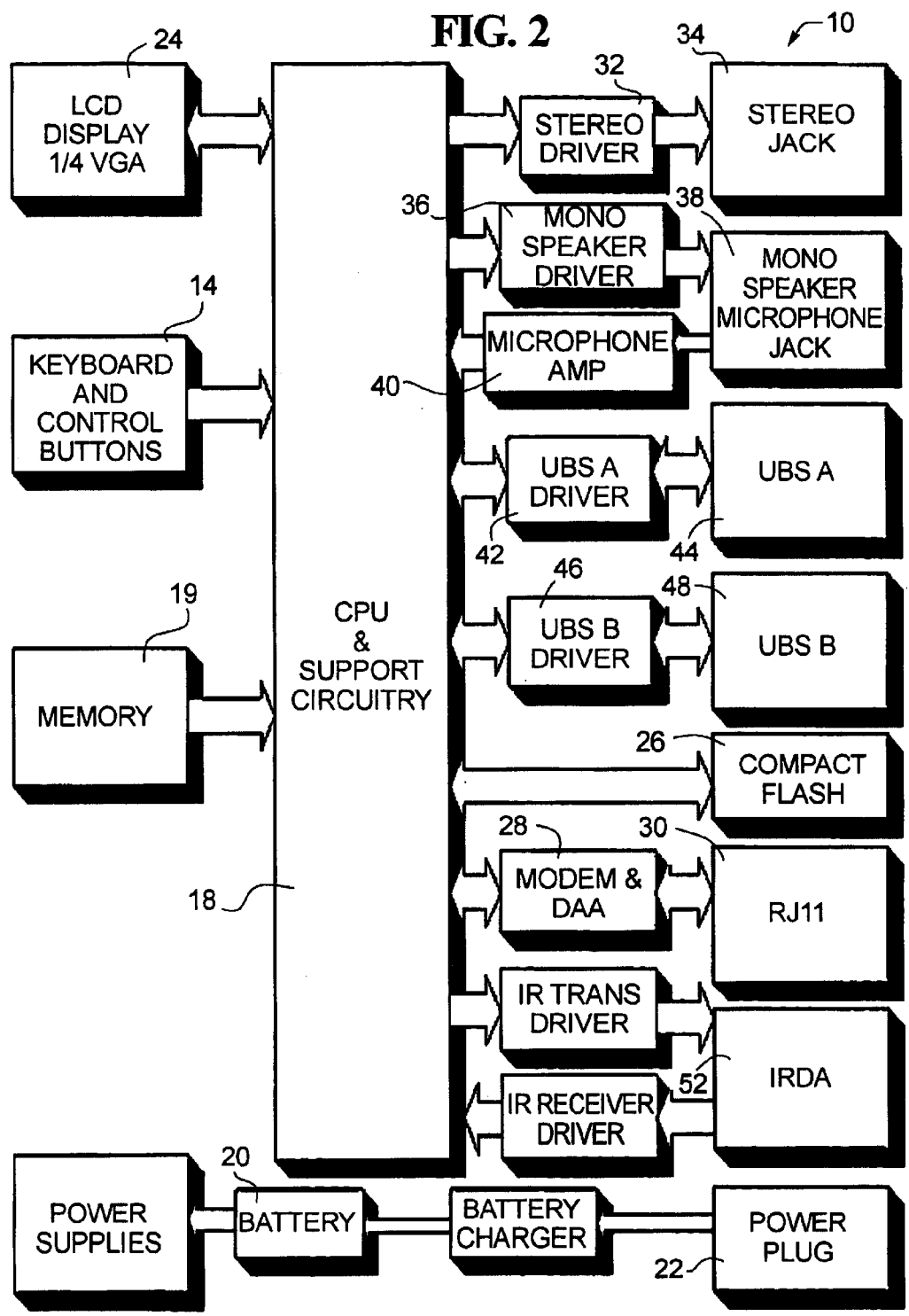
FIG. 2 is a simplified block diagram of the computer components of the hand held computer in accordance with an exemplary embodiment of the present invention.
Figure 4D:
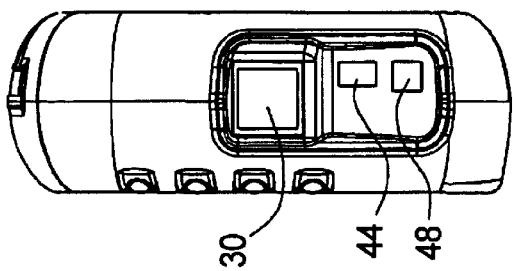
FIGS. 4A, 4B, 4C and 4D are top, side and two end views of the hand held computer illustrating the integration of a plurality of I/O ports in the display housing in accordance with an exemplary embodiment of the present invention.
Figure 4A:
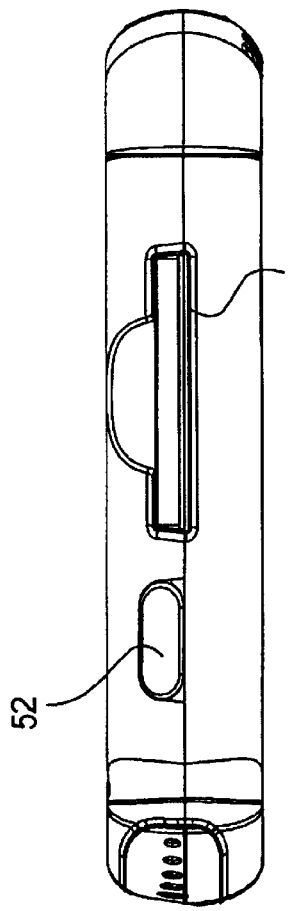
Figure 4B:
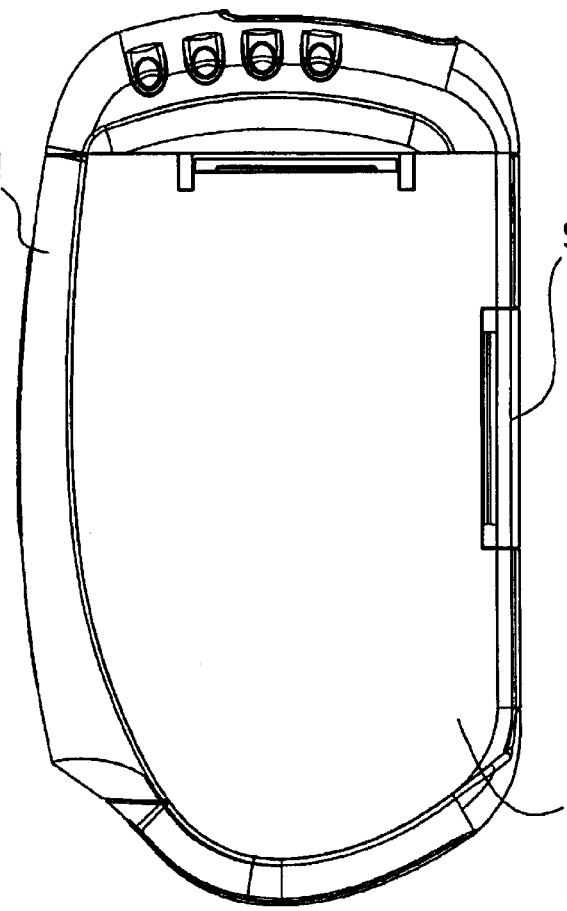
Figure 4C:
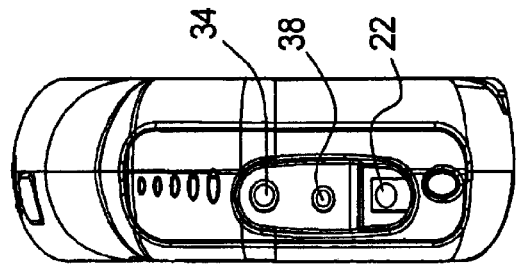

FIG. 2 is a simplified block diagram of the exemplary hand held computer 10 and illustrates the various components of the computer 10, including components mounted on the motherboard as well as other hardware of the hand held computer system. A microprocessor acts as the CPU 18 of the hand held computer 10. The CPU support circuitry preferably includes a data storage device or memory 19 that may be a nonvolatile device in the range of about ten to one hundred megabytes, wherein both control routines for applications and data files are stored in the data storage device. The data storage device 19 may be flash memory, CMOS ROM, CMOS RAM with battery, or a combination thereof. The data storage device interfaces with the CPU 18 via a dedicated high speed local bus structure through a bus timing controller. In the described exemplary embodiment, the CPU 18 is configured to drive the dedicated bus.

In the preferred embodiment, battery(s) 20 supplies power to hand held computer 10, and may be recharged in one or more of several ways through power interface port 22. The internal power traces are not shown in FIG. 2, but extend to all of the powered devices in the hand held computer 10.

In a preferred embodiment, a VGA display 24, typically a 320×240 grayscale or color screen acts as an I/O interface. The display screen may also include touch screen capability, so that a user may enter commands directly from the display screen. The size and location of VGA display 24 may vary, but in general occupies a major portion of one of the sides of the display housing. In addition, an exemplary hand held computer includes a full functioning compact keyboard 14 with complete alphanumeric capability.

The described exemplary hand held computer 10 may include an expansion interface 26 that functions as an expansion port. The purpose of the optional expansion interface 26 is to connect to optional peripheral devices, such as a local area network, an ethernet connection, a host cellular phone, two way pager and others. The expansion interface 26 is not an essential feature in a minimum embodiment of the present invention, but provides enhanced functionality in many embodiments. Preferably, the expansion interface 26 includes an extended enhanced parallel port and communication protocol that is compatible with typical expansion devices, such as telephone modems, fax modems, scanners, and the like. Many other configurations are possible.

In an exemplary embodiment, the expansion interface 26 comprises a compact flash connector that couples compact flash modules inserted into a compact flash socket to an expansion bus coupled to the CPU 18. As is known in the art, compact flash modules are small, removable mass storage devices. Compact flash products are solid state, containing no moving parts, and provide users with greater protection of their data than conventional magnetic disk drives. In operation, when a compact flash module is inserted into the hand held computer the hand held computer identifies the function of the module. The hand held computer may then display an icon and configuration support information for the inserted module on the display panel.

The compact flash module preferably uses system drivers and resources from the BIOS of the hand held computer. The compact flash module will provide the core software that is required for that function. The compact flash socket is not just designed for memory storage. Rather the compact flash socket may can be used as an expansion port for a number of hardware add-ons that range from digital cameras or video recorders to hardware that receives satellite global positioning information to display an exact position on a map on the display 24.

Further, the hand held computer may interface with commercially available digital compact flash phone cards. The digital phone cards interface directly with digital phones to provide wireless Internet connectivity. In operation, a wireless or cellular uplink connection between a user and Internet access provider may be established when a user transmits Internet access commands over its associated antenna in a predetermined data format, e.g., the well-known Cellular Digital Packet Data (CDPD) format.

A base station serving the coverage area in which the user is located receives the data via its associated antenna. The base station then sends the data to a conventional mobile telephone switch office (MTSO) for presentation to an Internet Access Provider (hereinafter also IAP). The IAP then reformats the data (command/request) for transmission to the identified web/host site over Internet. The IAP also transports responses received from the host site/Internet to the cellular base station via the MTSO. The cellular base station in turn, reformats the data into a form expected by the user unit identified in the response received, and transmits the reformatted data over its associated antenna.

In addition, one or more companies have recently developed software for use on portable computers that permits two-way transfer of real-time voice information between two personal computers via an Internet data link. A user of the hand held personal computer 10 may utilize the compact flash socket 26 to invoke a voice data interface mode. In voice data mode, voice signals, or other audio sounds, are received by a microphone at 38 that is coupled to the hand held personal computer. The software on the hand held computer then converts voice signals from analog to digital format. The software facilitates data compression down to a rate compatible with modem communication via a POTS (Plain Old Telephone Service) telephone line. The software also facilitates encapsulation of the digitized and compressed voice data into the TCP/IP (Transmission Control Protocol/Internet Protocol) protocol, with appropriate addressing to permit communication via the Internet. At the receiving end, the computer and software reverse the process to recover the analog voice information for presentation to the other party. Such programs permit telephone-like communication between Internet users registered with Internet Phone Servers.

The preferred embodiment of the hand held computer 10 includes an integrated internal modem 28 with a Data Access Arrangement (DAA). The modem 28 is connected to the CPU 18 via a dedicated communication bus. Industry accepted communication protocol may be used to drive the internal modem 28. An industry standard RJ11 jack 30 interfaces the internal modem 28 with external phone lines. An exemplary embodiment of the hand held computer includes a plurality of I/O ports. The real time operating system utilizes an I/O manager and file manager to support the input/output (I/O) features. File managers are hardware-independent modules designed to handle I/O processing for a specific class of devices. Device drivers handle the basic physical I/O functions for specific controllers. The device-descriptors are small, non-executable modules that associate a specific I/O device with a logical name, hardware address, device driver name, and initialization parameters.

The file managers provide an abstraction layer between the application and the physical hardware and provide logical I/O support such as opening, reading, or writing for a device. Device drivers handle physical I/O such as initializing the device and reading or writing a standard physical unit of data from the device. In addition as new I/O devices are added to the hand held computer, a user may utilize the existing file managers for the logical I/O support and easily develop the code to handle the physical I/O device.

For example, an exemplary embodiment of the present invention may include MP3 (MPEG audio level 3) software loaded on the data storage device 19 or the compact flash socket 26 to support stereo audio. The MP3 software provides the capability to download, store and play digitized MP3 music files. The described exemplary hand held computer may download digitized music files from the Internet or from another hand held computer or computing device. The hand held computer may store digitized music files on the compact flash memory module or locally in memory. The operating system, therefore, preferably includes a software driver that drives a stereo driver circuit 32 that provides I/O support for external stereo headsets (not shown) via stereo jack 34.

Further, an exemplary embodiment of the hand held personal computer includes a mono speaker driver circuit 36 and a microphone/amplifier driver circuit 40 that drive a mono-speaker and microphone jack 38, respectively. The mono-speaker and microphone jack 38 may be used for example to provide IP (Internet Protocol) phone capability as previously discussed. Similarly, an exemplary hand held personal computer may include USB A 42 and USB B 46 drivers and interface ports 44 and 48, respectively, to interface with a plurality of host/receiver peripherals as is known in the art (USB=Universal Serial Bus). In addition, a IR (InfraRed) transceiver 52 may be included in an exemplary hand held computer. The IR transceiver may be used to communicate with other hand held computers as well as other peripherals such as for example printers, scanners, etc.

FIGS. 3A–3D graphically illustrate the physical interface between the various I/O ports and the motherboard 50. As previously described, an exemplary hand held computer may include a power interface port 22 for recharging the internal power batteries, as well as a mono—speaker/microphone port 38 and stereo port 34 for external audio input and output. A hand held computer may also include an IR transceiver 52 in accordance with industry standards for communicating with other hand held computers or with other external peripherals. The CF (Compact Flash) socket 26 houses the compact flash modules and the RJ11 jack 30 provides a standardized interface between the internal cable modem with external phone lines. Similarly, the USB A port 44 provides a standardized interface to host computers and other standard peripherals and the USB B port 48 provides a receiver interface to compatible devices such as digital cameras or other peripherals. The top, rear, left side and right side views of FIGS. 4A–4D illustrate the integration of the various I/O ports in the display housing 12.

Referring back to FIG. 1 a front surface 50 of the display housing comprises, in substantial part, a display screen 24 for displaying stored or downloaded information. The display screen 24 may provide touch screen capability so that a user may enter commands directly from the display screen. In these touch-screen embodiments, an invisible touch panel or membrane may be set over the display apparatus. In one embodiment, the touch screen may be of the voltage-divider type that detects a contacting position in a touch panel sensor, as is known in the art. Voltage divider touch screens comprise a pair of substrates (an "X substrate" and a "Y substrate") spaced from each other by a gap, and on each of which a layer or region of resistive material is provided. A pair of lines formed of conductive material are provided at opposed edges of each of the resistance layers. The resistance layers face each other in overlapping relationship with the conduction lines of one substrate extending in a generally perpendicular direction to the conduction lines of the other substrate. Digital to Analog (D/A) circuitry is provided by which a voltage is applied and switched between the respective substrates through their respective conduction lines so that one substrate (active) is coupled between five volts and ground and the other is unconnected (inactive).

Therefore, when the touch panel is depressed at a point in its active area, the resistance layers flex into engagement at a particular point, and a voltage indicative of the Y coordinate is read from the X substrate utilizing Analog to Digital circuitry. Then the applied voltage is switched from the Y substrate to the X substrate, and a voltage indicative of the X coordinate is read from the Y substrate in the same manner. When voltage is applied to a given substrate, the resistive layer on the substrate acts as a voltage divider, and the other substrate acts like a wiper arm of a potentiometer such that the coordinate position of the contacting point can be detected.

In the touch screen embodiments, the hand held computer displays icons, characters, etc., on the display screen. When an operator touches the icons or characters displayed on the display screen, a touch point is detected and the operators input is determined. In addition the front surface 50 of the display panel may have any number of control buttons for controlling the display and or for interfacing with the hand held computer.

In an exemplary embodiment, the keyboard 14 is preferably foldable. The foldable keyboard 14 has two substantially planar keyboard halves 54 and 56. Each of the keyboard halves comprise a rubberized keypad 58a and 58b and circuit board (not shown) supported by keyplates 60a and 60b having bottom plates with front, side and rear walls 62, 64, and 66, respectively. The keyboard sections 54 and 56 are coupled to one another by an intermediate hinge 70 such that when the keyboard is in the open position as shown in FIG. 1, the first keyboard half 54 is substantially coplanar with the second keyboard section 56. In addition, the right-hand keyboard half 56 includes a notch 82 to accommodate the hinge mechanism 16 that couples the display housing 12 and the keyboard 14 when the keyboard is in the folded position.

Figure 6:
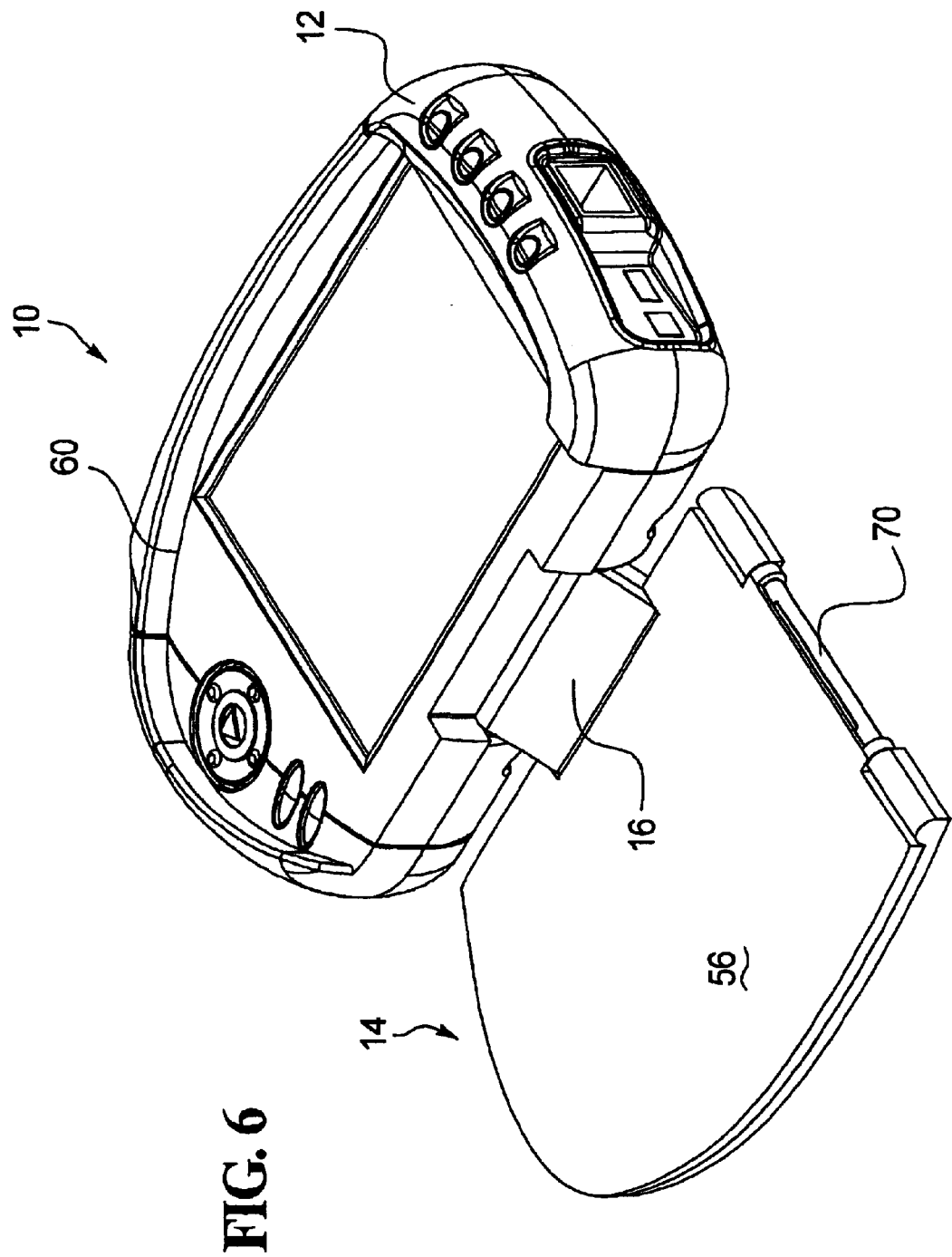
FIG. 6 is a perspective view of the hand held personal computer with the folding keyboard in the folded position in accordance with an exemplary embodiment of the present invention.

In addition, the keyboard halves 54 and 56 are of similar widths so that when keyboard section 56 is pivoted about the pivotal axis, into its folded position, it substantially overlays and is coincident with keyboard section 54 (see FIG. 6). It is readily apparent that other embodiments of this folding keyboard may have larger size keyboards or smaller size keyboards for alternate size devices.

Figure 7:
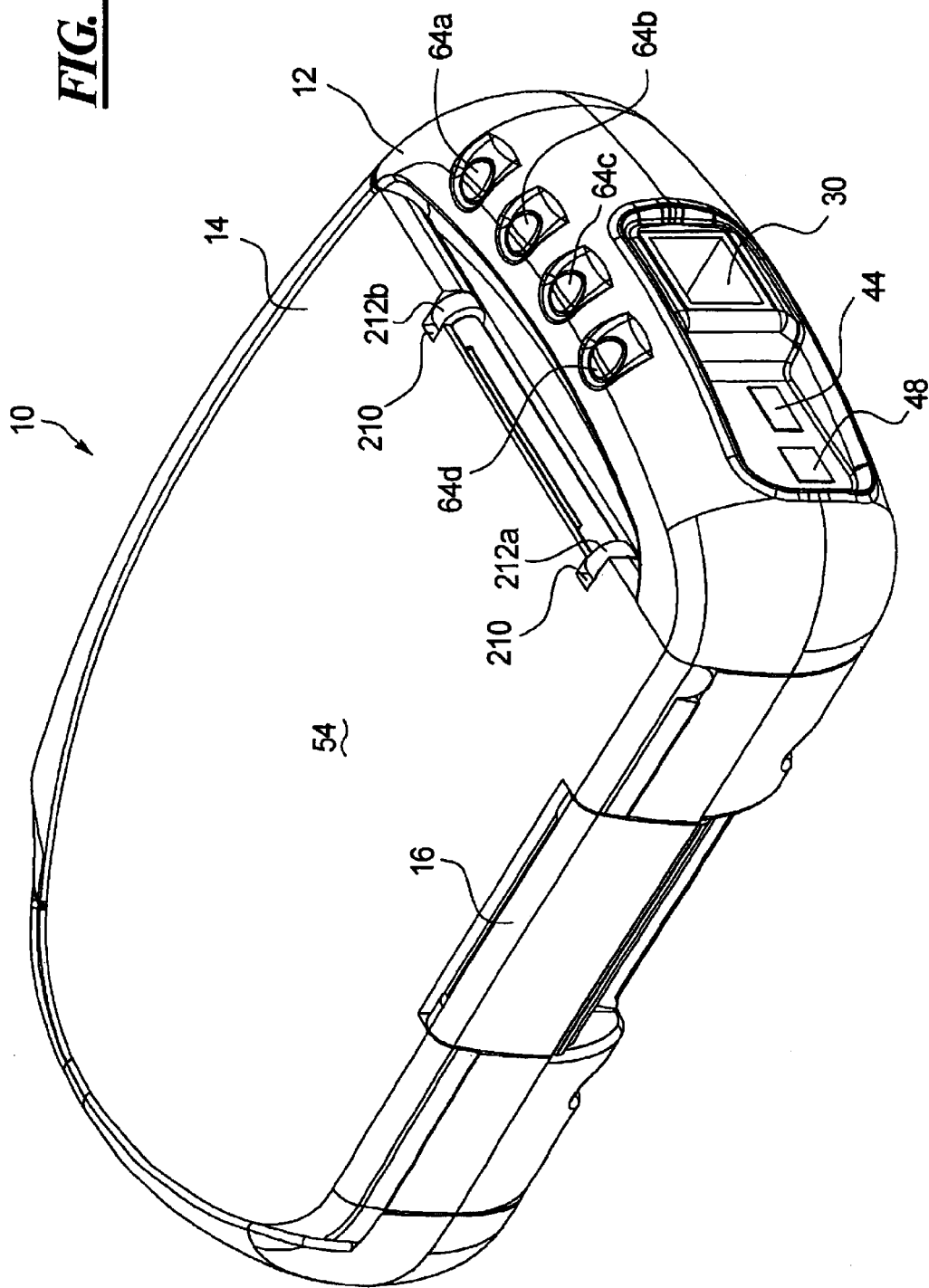
FIG. 7 is a perspective view of the hand held personal computer with the folding keyboard coupled to the display housing in the closed position in accordance with an exemplary embodiment of the present invention.

Referring to FIG. 7, the keyboard 14 may be folded and the display panel housing 12 may then be folded over the keyboard 14 into the closed position. Referring back to FIG. 6, in one embodiment the front face of the display housing 12 may include a recess 60 that engages the folded keyboard 14 such that the folded keyboard forms a protective cover over the display panel 24. Further, as shown in FIG. 7, the front surface 50 of the display housing 12 may also include control buttons for an MP3 player that may be accessed when the keyboard is in the closed position. In the described exemplary embodiment the hand held computer preferably includes buttons for play 64a, pause 64b, reverse 64c and forward 64d as the MP3 controls. A user therefore has full functional control over the MP3 player in the music mode, allowing the user to play music when the keyboard 14 is in the closed position, protecting the display.

Figure 8:
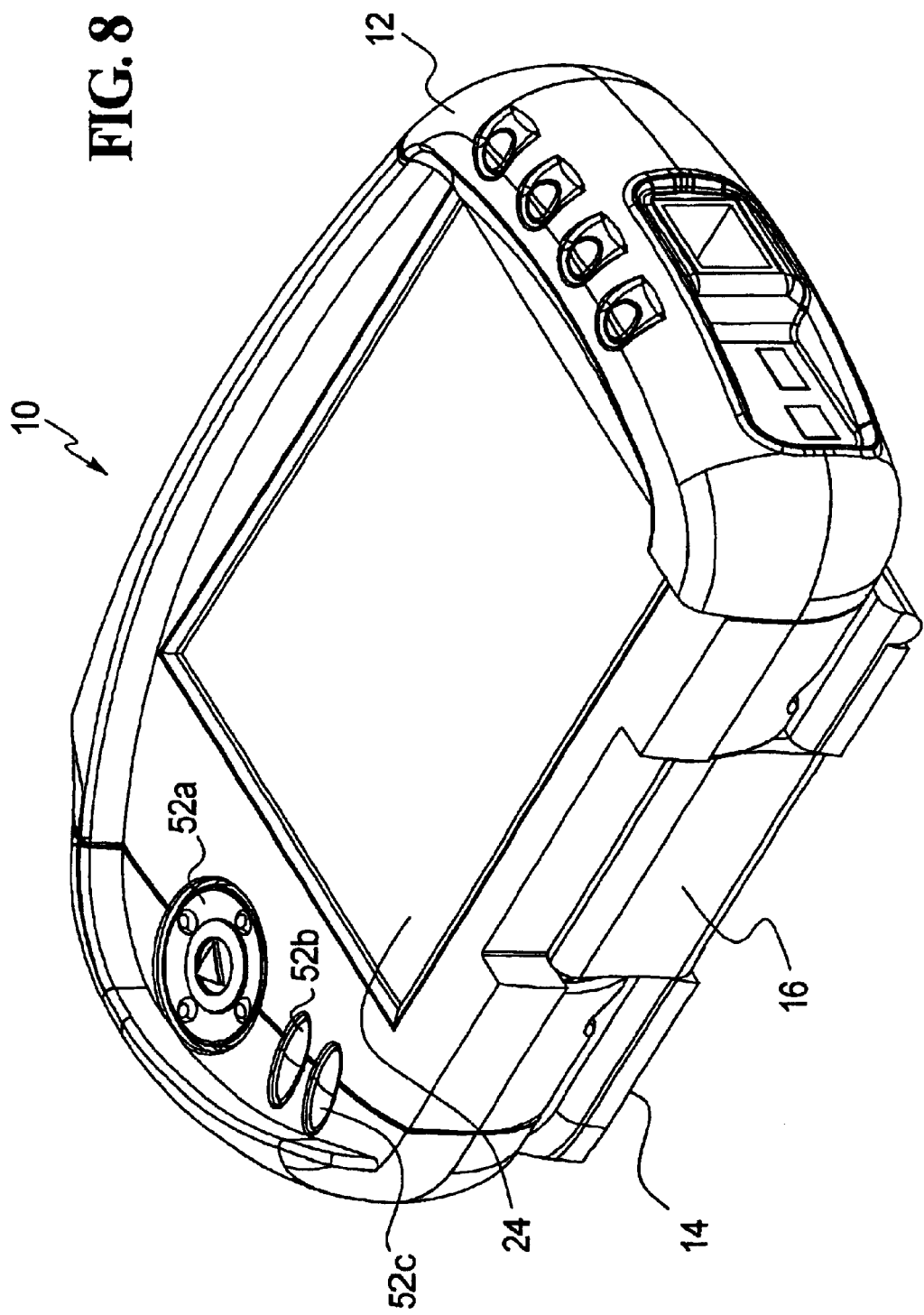
FIG. 8 is a perspective view of the hand held personal is computer with the folding keyboard rotated behind the display housing in accordance with an exemplary embodiment of the present invention.

Further, referring to FIG. 8, the keyboard 14 may be folded completely behind the display housing 12. The hand held computer 10 may then be controlled with the touch screen display panel 24 and front panel controls. For example, in one embodiment a cursor control 52a may be included to allow user input when the keyboard is in the folded position. In addition, mode 52b and select 52c controls may also be included on the front surface 50 of the display housing 12. In addition, when in a game mode, the MP3 control buttons located on the front surface of the display housing 12 may be converted to firing and game control buttons for interfacing with computer games. One of skill in the art will appreciate that alternate controls may be readily integrated into the display so that the described control features are by way of example only and not limitation.

Thus, the present device may be used in three different operating modes (the music mode, game mode and typing mode) corresponding to three different positions of the folding keyboard (covering the display panel, against the housing surface opposite the display panel, and unfolded to reveal the typing keys, respectively) relative to the housing.

Figure 9:
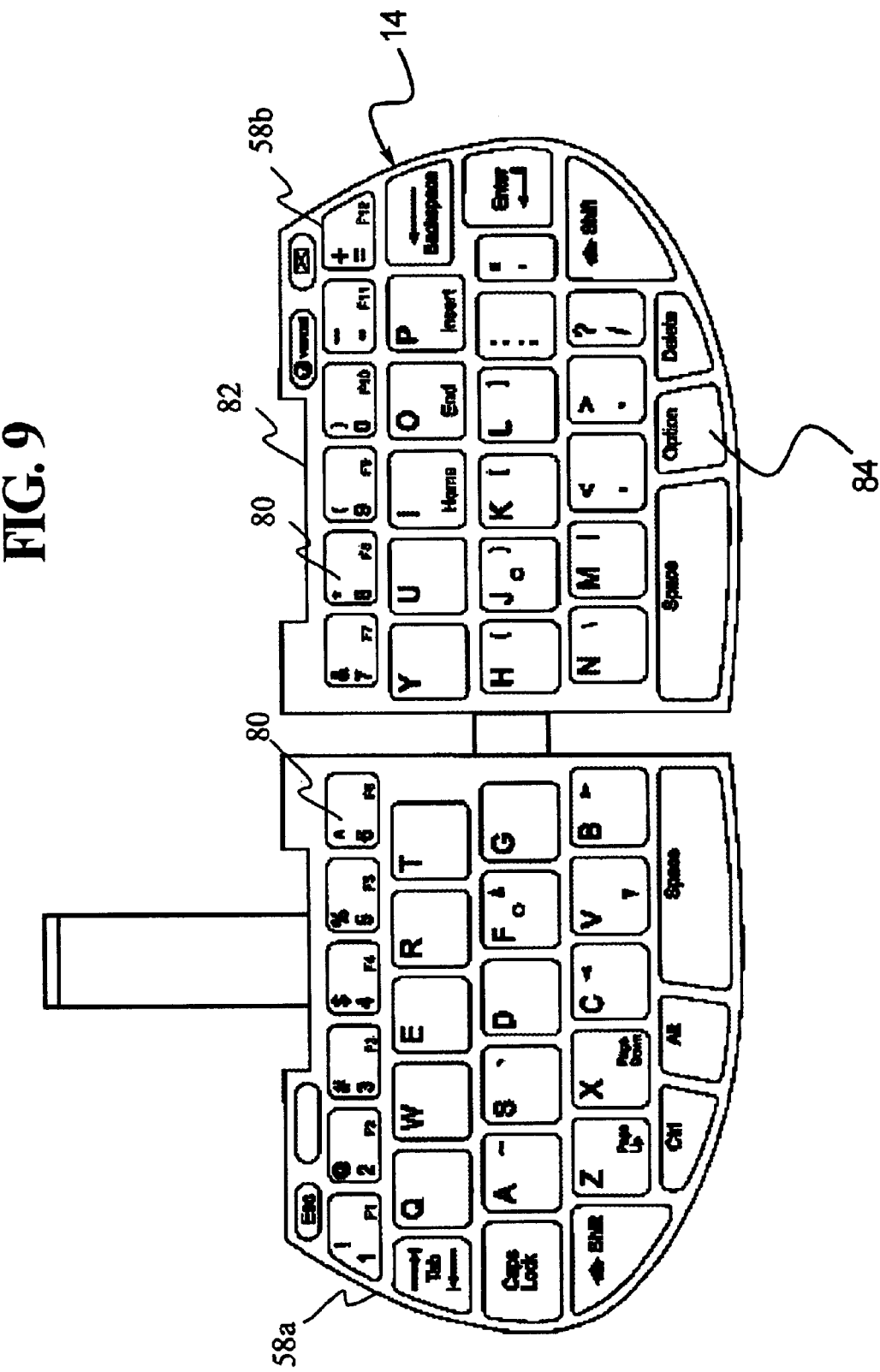
FIG. 9 is a plan view of keypad plate demonstrating the functionality of the folding keyboard in accordance with an exemplary embodiment of the present invention.

Referring to the plan view of an exemplary keypad plate illustrated in FIG. 9, each keypad section 58a and 58b has a plurality of depressable keys 80 arranged on a surface. Each of the keys 80 is substantially the same size as keys found on a standard keyboard. In an exemplary embodiment, the keys 80 are located in the "QWERTY" format found on most computers and typewriters, wherein keys in one row are staggered relative to the keys in an adjoining row. Therefore the adjoining key boundaries (e.g. "T" and "Y" keys) of the planar keypad sections 58a and 58b present a broken pattern of adjacent keys when the keyboard is unfolded so that the adjacent halves of the keyboards form substantially straight lines.

In addition, an exemplary keyboard may include an option function 84 to provide function key and other specialty key capability such as for example control arrows, page up or down, etc. One of skill in the art will appreciate that the keyboard of the present invention is equally usable with keyboard layouts having other formats. Therefore, the described exemplary keyboard format is by way of example and not by way of limitation.

The described exemplary keyboard 14 is a relatively thin, light weight keyboard. In the past tradeoffs have often been made between the "touch typing quality" of a keyboard and the acceptable thickness of the keyboard. Historically, making keyboards thinner often required reducing the depth of the keystroke. A keystroke of approximately three millimeters is typically favored by most users, particularly touch typists, because it is similar in feel to a desktop computer keyboard. The described exemplary keyboard maintains the feel and key travel of desktop computer keyboard.

Historically keycaps have typically included retainers to engage a front plate of a keyboard. Conventionally, each key is normally held in a raised position above the keyboard-base by a biasing device with an electrical switch connected between the keyboard-base and each key. In operation when a conventional key was depressed, contacts on a flexible dome make contact with electrical traces on a circuit board. This design suffers from the additional weight needed for the front plate and the thickness of the key includes space for the key travel both above and below the front plate. Therefore it would be difficult to make a key having a travel of three millimeters less than about nine millimeters thick using this type of key design.

Referring to the exploded view of FIG. 10A, the described exemplary keyboard utilizes low profile, flexible buttons and back supports to overcome these deficiencies and provide the user with an improved touch typing quality. FIG. 10A illustrates a cross section of a key 80 formed from a molded layer of flexible material 92, such as polyurethane, that is bonded to a circuit board. The flexible layer may have dome shaped finger pads 94 for keys, and the flexible circuit board (not shown) has electrically conductive traces 96 forming circuitry for communicating keystrokes to a control circuit module located in the keyboard or on the mother board within the display housing.

The lower surface of finger pad 94 includes a conductive contact 100 that forms a contact closure element. The key profile may be further reduced, and or the key travel further increased, by replacing the flexible dome as illustrated in FIG. 10A with a conductive coating 102 (such as for example carbon paint) on the underside of the reduced profile finger pad 98 as shown in FIG. 10B. The contact closure element selectively provides electrical contact with traces 96 on the circuit board when a user presses the finger pad 94. Contact closure causes a signal to be transmitted to a control circuit module to be coded for transmission to the computers processor. The regions of conductive material that form contact closure element 102 on the underside of the finger pads may be formed in accordance with any of a number of different ways known to those of skill in the art. For example, the conductive regions may be provided by a conductive, rubber-based coating applied in a conventional manner, such as by silk-screening, or other masking techniques.

Referring to the cross-section of FIG. 10C in the described exemplary embodiment, a structural rib 104 may be included around at least a portion of each key. The rib 104 is rigid to provide a firm offset of the key top from the circuit board for increased key travel. The rib also acts to stiffen the assembly when bonded to the circuit board. Although one type of key is illustrated and described, other types of keys, such as dome switches or membrane keys, with or without rigid keycaps, can also be used alone or in combination as needed or desired.

Referring to the exploded view of FIG. 11A, collectively the rubberized keypad and circuit board are coupled to each of the keyboard plates 60a and 60b of the keyboard halves or sections 54 and 56, so that the two circuit board halves 60a and 60b are flat, and registered with the keys of their respective section. The keyboard plates 60a and 60b are pivotally coupled by a hinge mechanism 70 along the centerline of the keyboard plates. Keyboard plate 60a may include semi-cylindrical projections 202a and 202b extending over the side wall 64 along the centerline of the keyboard plate 60a. The semi-cylindrical projections 202a and 202b preferably include end caps 206 having hinge pins 208 which in part form a pivot axis about which the keyboard halves pivot. In the described exemplary embodiment there are notches 210 formed between the centerline sidewall 64 of keyboard plate 60a and the semi-cylindrical projections 202a and 202b that provide clearance for collars 212a and 212b formed on the centerline of keyboard plate 60b. The collars 212a and 212b couple to the hinge pins 68 forming a hinge mechanism 70 that allows keyboard plate 60b to rotate relative to keyboard 60a.

The circuit boards 200a and 200b for each keyboard half are preferably electrically coupled by a flex ribbon 214. The centerline sidewalls of keyplates 60a and 60b preferably include notches that receive the flex ribbon 214. When the keyboard sections are in the open, unfolded position, the flexible ribbon 214 is straightened into a flat, planar shape. However, when in the closed or folded position the flexible ribbon 214 is curved in the perpendicular, cylindrical direction between the sections.

The flex ribbon 214 is susceptible to mechanical damage. Therefore, the described exemplary keyboard preferably includes a protector comprising top and bottom flex ribbon sleeves 216 and 218, as shown in FIGS. 11B and 11C. The flex ribbon sleeves insulate the flex ribbon from mechanical damage and allow the ribbon to flex freely during opening and closing. The flex ribbon sleeves may be molded with an arch from a suitable synthetic material, such as a highly elastic soft shore PVC, for flexing in both the x axis and y axis. Therefore, when the keyboard is in the open position (see FIG. 11B) the tension in the flexible ribbon straightens the flex ribbon sleeves into a relatively flat, planar shape. When the keyboard is closed, however, the flex ribbon sleeves retain the molded arch (see FIG. 11C).

In an exemplary embodiment, the ribbon sleeves float freely and are not anchored to the keyboard. One of the flex ribbon sleeves, for example the lower sleeve 218, includes pins and the other flex ribbon sleeve, for example the upper sleeve 216, includes apertures that receive the pins of the opposite sleeve to couple the two sleeves together, thereby enclosing a portion of the flex ribbon. Alternatively, a one piece ribbon sleeve with a live hinge that snaps together on one end may also be used.

In the described exemplary embodiment, a second flex ribbon 230 electrically couples the keyboard to the computer electronics, which are located in the display housing. Upper and lower hinge parts 232 and 234, preferably include opposing pins and recesses that couple the hinge parts to each other. The hinge parts enclose the second flexible ribbon 230, and include semicircular 236a and 236b apertures that couple to hinge pins 238a and 238b formed in a notch 240 at the rear of keyboard plate 54. The hinge parts 232 and 234 further include semi-circular recesses 242a and 242b that couple to hinge pins 244a and 244b located within a notch formed in the lower enclosure 246 of the display housing. The top enclosure 248 of the display housing includes a notch 250 that provides clearance for the upper hinge part 232 when the keyboard is in the folded and closed position.

Referring to FIGS. 12A–12C, the described exemplary handheld computer preferably includes a support member 300 pivotally hinged to a lower surface 302 of the lower enclosure 246 of the display housing. The support member 300 allows the hand held personal computer to be used on a table top. The support member 300 preferably positions the display panel at a plurality of viewing angles (see FIGS. 12A, 12B, and 12C) to accommodate the height of the user and local lighting conditions. Referring to FIG. 13, the lower surface 302 of the display panel housing preferably includes recesses 304 that engage the support stand when rotated into a retracted position as shown in FIG. 14. The support member preferably includes hinge pins having flat areas that couple to ribs within the upper surface of the display housing.

Although a preferred embodiment of the present invention has been described, it should not be construed to limit the scope of the present invention. Those skilled in the art will understand that various modifications may be made to the described embodiment. For example, the present invention is readily performs as an E-Book reader, capable of downloading and displaying all digital texts from any library worldwide. Similarly, the present invention may also include stereo audio with the capability to download record and play MP3 music files. Moreover, to those skilled in the various arts, the invention itself herein will suggest solutions to other tasks and adaptations for other applications. It is applicants intention to cover by claims all such uses of the invention and those changes and modifications that could be made to the embodiments of the invention herein chosen for the purpose of disclosure without departing from the spirit and scope of the invention.

What is claimed is:

1. A computer apparatus, comprising:
   a housing having a display mounted in a first surface of said housing, said housing having a second surface opposite said first surface, said housing including operating controls;
   a computer circuit within said housing including a processor and memory, said computer circuit being capable of operation in at least two different operating modes, at last one of said at least two operating modes being controlled by said operating controls on said housing; and
   a folding keyboard hingedly connected to said housing and having an electrical connection to said computer circuit in said housing, said folding keyboard being positionable in a first position so as to adapt said computer apparatus for operation in a first of said at least two operating modes, said folding keyboard being positionable in a second position so as to adapt said computer apparatus for operation in a second of said at least two operating modes, ones of said operating controls being accessible for option when said folding keyboard is in said first position and when said folding keyboard is in said second position;
   wherein said housing includes a recess on said first surface, and said folding keyboard fits into said recess when in said first position;
   wherein said first operating mode is a music playing mode and said operating controls are music playing controls;
   wherein said second operating mode is at least one of a game playing mode and a touch screen mode; and
   wherein said game playing mode and said touch screen mode is characterized by said folding keyboard being against said second surface of said housing so as to expose said display and said operating controls for at least one of playing a computer game and use of said display as a touch screen.

2. A computer apparatus as claimed in claim 1, wherein said music playing mode is characterized by said keyboard covering said display and leaving exposed said operating controls for playing music.

3. A computer apparatus as claimed in claim 1, wherein said ones of said operating controls operate to play music in said music playing mode and said same ones of said operating controls operate to play games in said game playing mode.

4. A computer apparatus as claimed in claim 1, wherein said folding keyboard is folded into a position to cover alphanumeric keys on said folding keyboard while in said game playing mode.

5. A computer apparatus, comprising:
   a housing having a display mounted in a first surface of said housing, said housing having a second surface opposite said first surface, said housing including operating controls;

a computer circuit within said housing including a processor and memory, said computer circuit being capable of operation in at least two different operating modes, at least one of said at least two operating modes being controlled by said operating controls on said housing; and a folding keyboard hingedly connected to said housing and having an electrical connection to said computer circuit in said housing, said folding keyboard being positionable in a first position so as to adapt said computer apparatus for operation in a first of said at least two operating modes, said folding keyboard being positionable in a second position so as to adapt said computer apparatus for operation in a second of said at least two operating modes, ones of said operating controls being accessible for operation when said folding keyboard is in said first position and when said folding keyboard is in said second position;

wherein said first operating made is a music playing mode and said operating controls are music playing controls;

wherein said second operating mode is at least one of a game playing mode and a touch screen mode; and wherein said at least two operating modes includes three operating modes and a third operating mode is a typing mode.

6. A computer apparatus as claimed in claim 5, wherein said typing mode is characterized by said keyboard being fully open to expose a set of alphanumeric keys and function keys for typing use.

7. A computer apparatus, comprising:

a housing having a display mounted in a first surface of said housing, said housing having a second surface opposite said first surface, said housing including operating controls;

a computer circuit within said housing including a processor and memory, said computer circuit being capable of operation in at least two different operating modes, at least one of said at least two operating modes being controlled by said operating controls on said housing; and a folding keyboard hingedly connected to said housing and having an electrical connection to said computer circuit in said housing, said folding keyboard being positionable in a first position so as to adapt said computer apparatus for operation in a first of said at least two operating modes, said folding keyboard being positionable in a second position so as to adapt said computer apparatus for operation in a second of said at least two operating modes, ones of said operating controls being accessible for operation when said folding keyboard is in said first position and when said folding keyboard is in said second position;

wherein said housing includes a recess on said first surface, and said folding keyboard fits into said recess when in said first position;

wherein said first operating mode is one of a game playing mode and a touch screen mode; and wherein said game playing mode and said touch screen mode are characterized by said keyboard being folded against said second surface of said housing so as to expose said display and operating controls for at least one of playing a computer game and using said display as a touch screen while covering alphanumeric keys on said keyboard.

8. A computer apparatus as claimed in claim 7, wherein said second operating mode is a typing mode.

9. A computer apparatus as claimed in claim 8, wherein said typing mode is characterized by said keyboard being fully open to expose a set of alphanumeric keys and function keys for typing use.

10. A computer apparatus as claimed in claim 7, wherein said second mode is a music playing mode.

11. A computer device, comprising:

a housing having a display mounted in a first surface of said housing, said housing having a second surface opposite said first surface;

a computer circuit within said housing including a processor and memory, said computer circuit being capable of operation in three different operating modes; and a folding keyboard hingedly connected to said housing and having an electrical connection to said computer circuit in said housing, said folding keyboard being positionable in three different positions corresponding to said three operating modes;

wherein said housing includes first and second sets of controls corresponding to first and second operating modes of said three different operating modes.

12. A computer device as claimed in claim 1, wherein said folding keyboard has an alphanumeric key arrangement and wherein said keyboard is positioned in a first position of said three different positions to block access to said second set of controls and to said alphanumeric key arrangement while leaving said first set of controls on said housing accessible for use in said first operating mode.

13. A computer device as claimed in claim 12, wherein said first position of said folding keyboard covers said display.

14. A computer device as claimed in claim 11, wherein said first set of controls operates to control said first mode of operation when said folding keyboard is in said first position and said first set of controls operates to control said second mode of operation when said folding keyboard is in said second position.

15. A computer device as claimed in claim 11, wherein said housing includes a recess on said first surface, and said folding keyboard fits into said recess when in said first position.

16. A computer device as claimed in claim 11, wherein said folding keyboard is positioned in a second position of said three different positions to block access to said alphanumeric key arrangement while leaving said second set of controls on said housing accessible for use in said second operating mode.

17. A computer device as claimed in claim 16, wherein said folding keyboard in said second position provides visual access to said display.

18. A computer device as claimed in claim 16, wherein said folding keyboard is positioned in a third position of said three different positions to enable access to said alphanumeric key arrangement.

19. A computer device as claimed in claim 18, further comprising:

a stand on said housing disposed to support said housing on a surface with said display in a viewing position; and wherein said folding keyboard in said third position is positioned substantially flat on said surface for typing on said alphanumeric key arrangement and said housing is supported on said stand in a position for viewing of said display.

20. A computer device as claimed in claim 19, wherein said stand is pivotably mounted on said housing, said housing including a recess on said second surface, and said stand being pivotable into said recess on said second surface.

21. A computer device, comprising:
a housing having a display mounted in a first surface of said housing, said housing having a second surface opposite said first surface;
a computer circuit within said housing including a processor memory, said computer circuit being capable of operation in three different operating modes, a first of said three different operating modes being a music playing mode and a second of said three different operating modes being a game playing mode and a third of said three different operating modes a typing mode;
a folding keyboard hingedly connected to said housing and having an electrical connection to said computer circuit in said housing, said folding keyboard being positionable in three different positions corresponding to said three different operating modes;
music playing controls on said housing at a position which is accessible for use while said folding keyboard is in a first of said three different positions to enable use of said device in said music playing mode;
game playing controls on said housing at a position which is accessible for use while said folding keyboard is in a second of said three different positions to enable use of said device in said game playing mode; and
alphanumeric keys on said keyboard at a position which is accessible for use while said folding keyboard is in a third of said three different positions to enable use of said device in said typing mode.

22. A computer device as claimed in claim 21, wherein said game playing controls are covered and inaccessible for use by a user while said folding keyboard is in said first position corresponding to said music playing mode.

23. A computer device as claimed in claim 22, wherein said display is covered while said folding keyboard is in said first position corresponding to said music playing mode.

24. A computer device as claimed in claim 22, wherein said alphanumeric keys are covered and inaccessible for use by a user while said folding keyboard is in said second position corresponding to said game playing mode, said display being uncovered and viewable while said folding keyboard is in said second position.

25. A computer device as claimed in claim 24, wherein said folding keyboard is folded against said second surface of said housing in said second position.

26. A computer device as claimed in claim 24, wherein said alphanumeric keys are covered and inaccessible for use by a user while said folding keyboard is in said first position corresponding to said music playing mode.

27. A computer device as claimed in claim 21, further comprising:
a stand on said second surface of said housing, said stand being pivotable between a position in a recess in said second surface of said housing and a position extending from said housing to support said housing on a work surface with said display in a viewing position; and
wherein said folding keyboard in said third is positioned substantially flat on said work surface for typing on said alphanumeric key arrangement and said housing is supported on said stand in a position for viewing of said display.

28. A computer device as claimed in claim 21, wherein said housing includes a recess into which said folding keyboard fits in said first position.

29. A computer device as claimed in claim 21, wherein said music playing controls switch functions to become game playing controls when said computer device is changed from said music playing mode to said game playing mode.

30. A computer device, comprising:
a housing having a first surface of said housing, said housing having a second surface opposite said first surface;
a computer circuit within said housing including a processor and memory, said computer circuit being capable of operation in three different operating modes, a first of said three different operating modes being a music playing mode and a second of said three different operating modes being a touch screen mode and a third of said three different operating modes being a typing mode;
a folding keyboard hingedly connected to said housing and having in electrical connection to said computer circuit in said housing, said folding keyboard being positionable in three different positions corresponding to said three different operating modes;
music playing controls on said housing at a position which is accessible for use while said folding keyboard is in a first of said three different positions to enable use of said device in said music playing mode;
a touch screen display on said housing at a position which is accessible for use while said folding keyboard is in a second of said three different positions to enable use of said device in said touch screen mode; and
alphanumeric keys an said keyboard at a position which is accessible for use while said folding keyboard is in a third of said three different positions to enable use of said device in said typing mode.

31. A computer device as claimed in claim 30, wherein said alphanumeric keys are covered and inaccessible for use by a user while said folding keyboard is in said second position corresponding to said touch screen mode, said touch screen display being uncovered and accessible while said folding keyboard is in said second position.

* * * * *